US012619391B2

(12) United States Patent　　　　　　(10) Patent No.:　US 12,619,391 B2

Tu et al.　　　　　　　　　　　　　　　(45) Date of Patent:　　May 5, 2026

(54) SYSTEM, DEVICE AND METHOD FOR EMBEDDING CREDENTIALS ON AN ELECTRONIC DOCUMENT

(71) Applicant: KDAN MOBILE SOFTWARE LTD., Tainan City (TW)

(72) Inventors: Hsuan Tu, Tainan City (TW); Wei-Chih Sun, Tainan City (TW); Jia-Rou Lee, Tainan City (TW); Ting-Wei Huang, Tainan City (TW); Cheng-Yu Tsai, Tainan City (TW)

( * ) Notice: Subject to any disclaimer, the term of this patent is extended or adjusted under 35 U.S.C. 154(b) by 59 days.

(21) Appl. No.: 18/641,998

(22) Filed: Apr. 22, 2024

(65) Prior Publication Data

US 2024/0356915 A1　　Oct. 24, 2024

Related U.S. Application Data

(60) Provisional application No. 63/460,700, filed on Apr. 20, 2023.

(51) Int. Cl.
　　*G06F 15/16*　　　(2006.01)
　　*G06F 3/14*　　　　(2006.01)
　　　　　　(Continued)

(52) U.S. Cl.
　　CPC ........ *G06F 3/1454* (2013.01); *H04L 63/0853* (2013.01); *H04L 65/1069* (2013.01)

(58) Field of Classification Search
　　CPC .......................... G06F 3/1454; H04L 63/0853; H04L 65/1069
　　See application file for complete search history.

(56) References Cited

U.S. PATENT DOCUMENTS 9,166,986 B1 * 10/2015 Saylor ................... G06F 21/645
2010/0027552 A1 * 2/2010 Hill ......................... H04L 67/51
370/401

(Continued)

FOREIGN PATENT DOCUMENTS

TW 　　　　202029691 A 　　8/2020

*Primary Examiner* — Normin Abedin

(74) *Attorney, Agent, or Firm* — OPES IP Consulting Co., Ltd.

(57) ABSTRACT

A system for embedding credentials on an electronic document includes a task assignment device, a document database, a signature server and a credential server. The task assignment device generates an assigned task. The signature server generates a first signature request and a second signature request according to the assigned task. A first electronic device generates first signature information according to the first signature request. A second electronic device generates second signature information according to the second signature request. The signature server generates a first credential request and a second credential request according to the first signature information and the second signature information. The credential server transmits a first credential object and a second credential object to the signature server in response to the first credential request and the second credential request. The signature server embeds the first credential object and the second credential object into an assignment document in sequence. The present disclosure also provides a method and a device for embedding credentials on an electronic document.

16 Claims, 11 Drawing Sheets

100

(51) Int. Cl.
    H04L 9/40         (2022.01)
    H04L 65/1069     (2022.01)

(56)           References Cited

U.S. PATENT DOCUMENTS

2013/0239230 A1\*   9/2013   Herbach  ............  G06F 21/6227
                                            726/28
2023/0016488 A1\*   1/2023   Chen  .....................  H04L 9/3247

\* cited by examiner

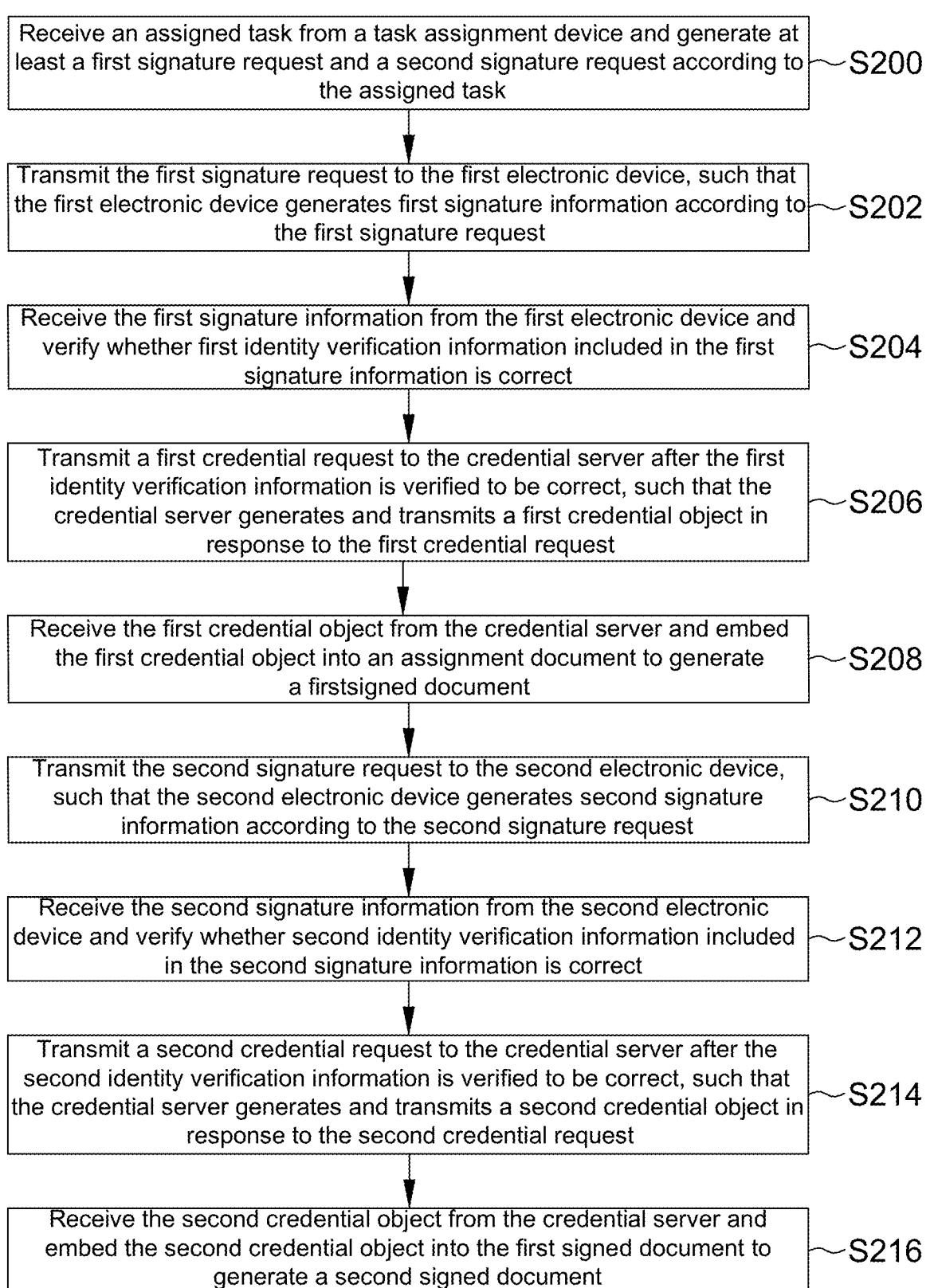

Receive an assigned task from a task assignment device and generate at least a first signature request and a second signature request according to the assigned task —S200

Transmit the first signature request to the first electronic device, such that the first electronic device generates first signature information according to the first signature request —S202

Receive the first signature information from the first electronic device and verify whether first identity verification information included in the first signature information is correct —S204

Transmit a first credential request to the credential server after the first identity verification information is verified to be correct, such that the credential server generates and transmits a first credential object in response to the first credential request —S206

Receive the first credential object from the credential server and embed the first credential object into an assignment document to generate a firstsigned document —S208

Transmit the second signature request to the second electronic device, such that the second electronic device generates second signature information according to the second signature request —S210

Receive the second signature information from the second electronic device and verify whether second identity verification information included in the second signature information is correct —S212

Transmit a second credential request to the credential server after the second identity verification information is verified to be correct, such that the credential server generates and transmits a second credential object in response to the second credential request —S214

Receive the second credential object from the credential server and embed the second credential object into the first signed document to generate a second signed document —S216

FIG. 5

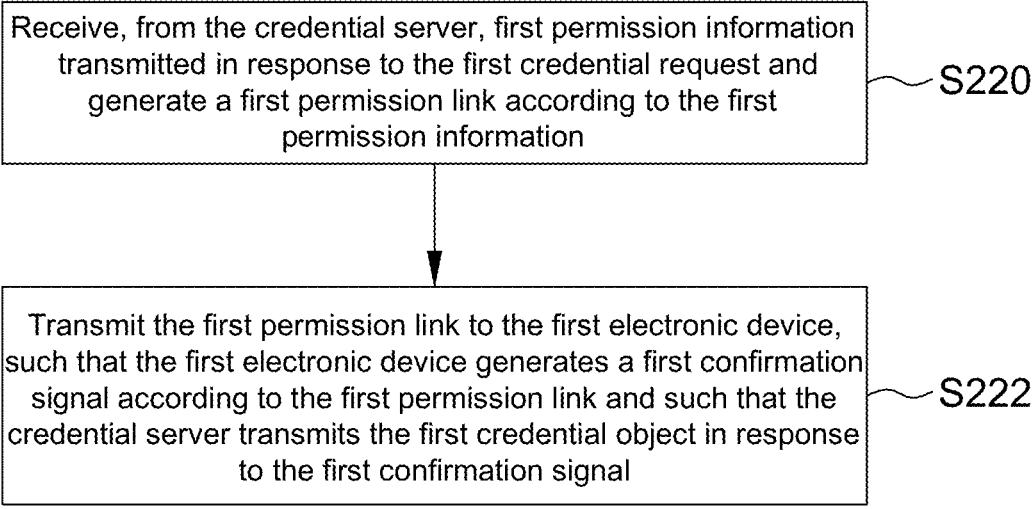

Receive, from the credential server, first permission information transmitted in response to the first credential request and generate a first permission link according to the first permission information — S220

Transmit the first permission link to the first electronic device, such that the first electronic device generates a first confirmation signal according to the first permission link and such that the credential server transmits the first credential object in response to the first confirmation signal — S222

FIG. 6A

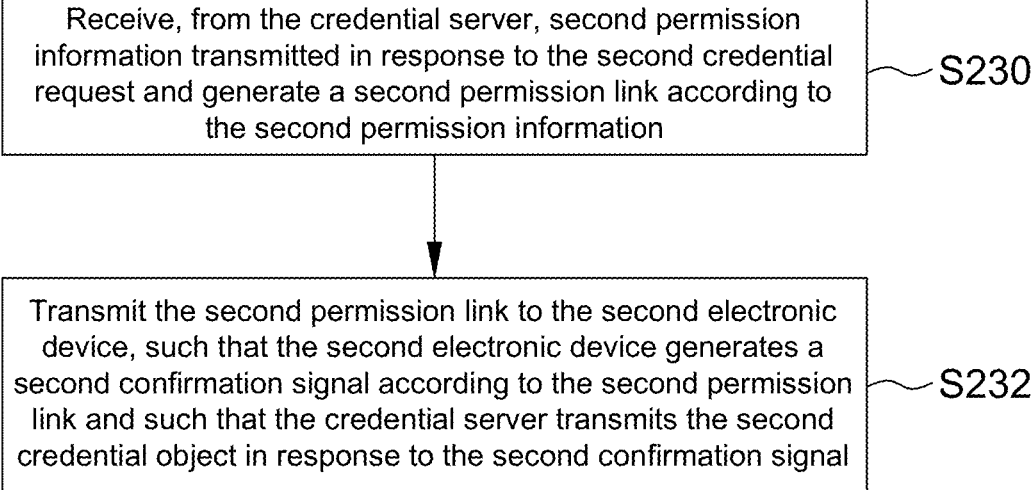

Receive, from the credential server, second permission information transmitted in response to the second credential request and generate a second permission link according to the second permission information — S230

Transmit the second permission link to the second electronic device, such that the second electronic device generates a second confirmation signal according to the second permission link and such that the credential server transmits the second credential object in response to the second confirmation signal — S232

FIG. 6B

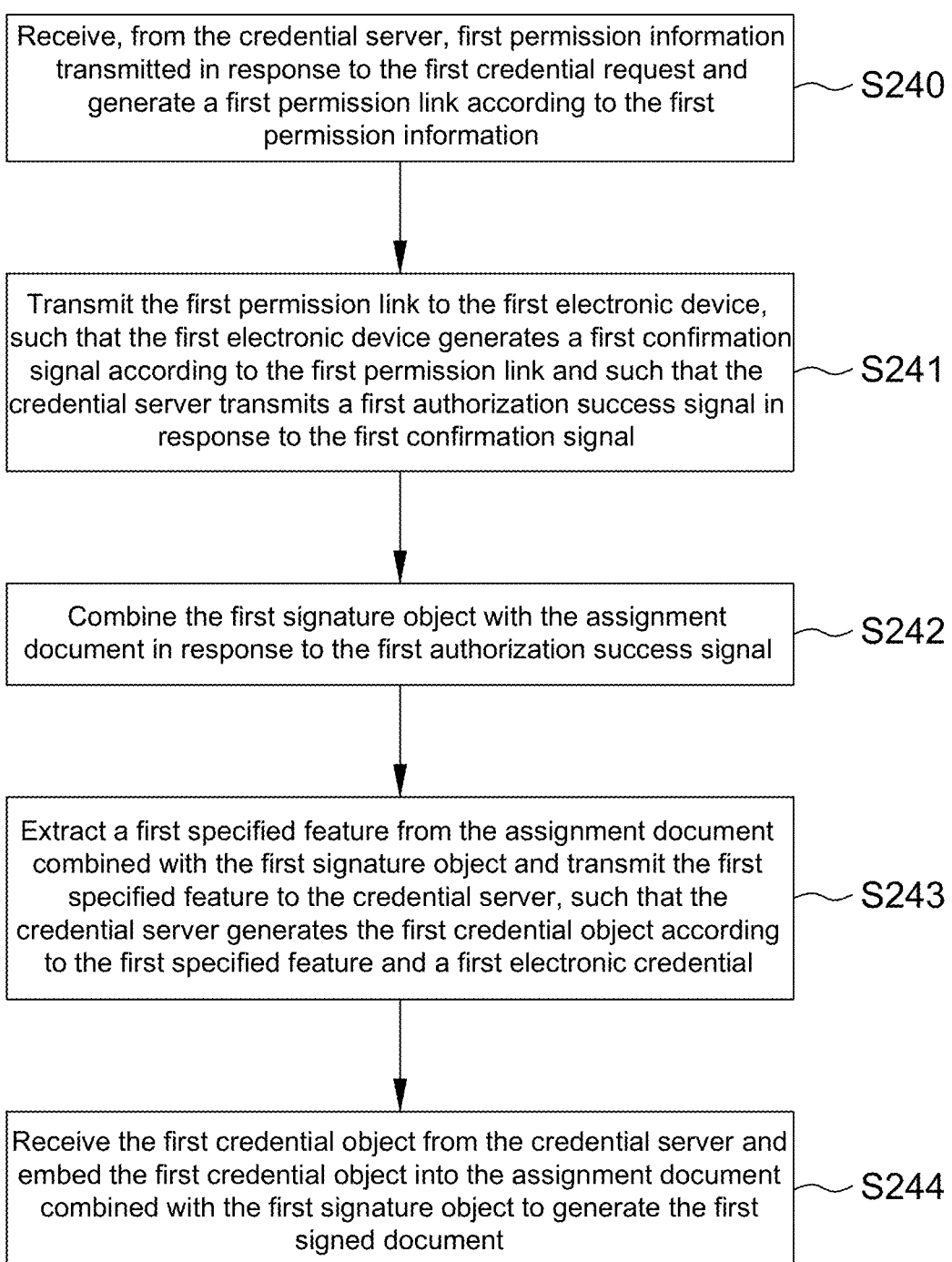

Receive, from the credential server, first permission information transmitted in response to the first credential request and generate a first permission link according to the first permission information ⟋∼ S240

Transmit the first permission link to the first electronic device, such that the first electronic device generates a first confirmation signal according to the first permission link and such that the credential server transmits a first authorization success signal in response to the first confirmation signal ⟋∼ S241

Combine the first signature object with the assignment document in response to the first authorization success signal ⟋∼ S242

Extract a first specified feature from the assignment document combined with the first signature object and transmit the first specified feature to the credential server, such that the credential server generates the first credential object according to the first specified feature and a first electronic credential ⟋∼ S243

Receive the first credential object from the credential server and embed the first credential object into the assignment document combined with the first signature object to generate the first signed document ⟋∼ S244

FIG. 7A

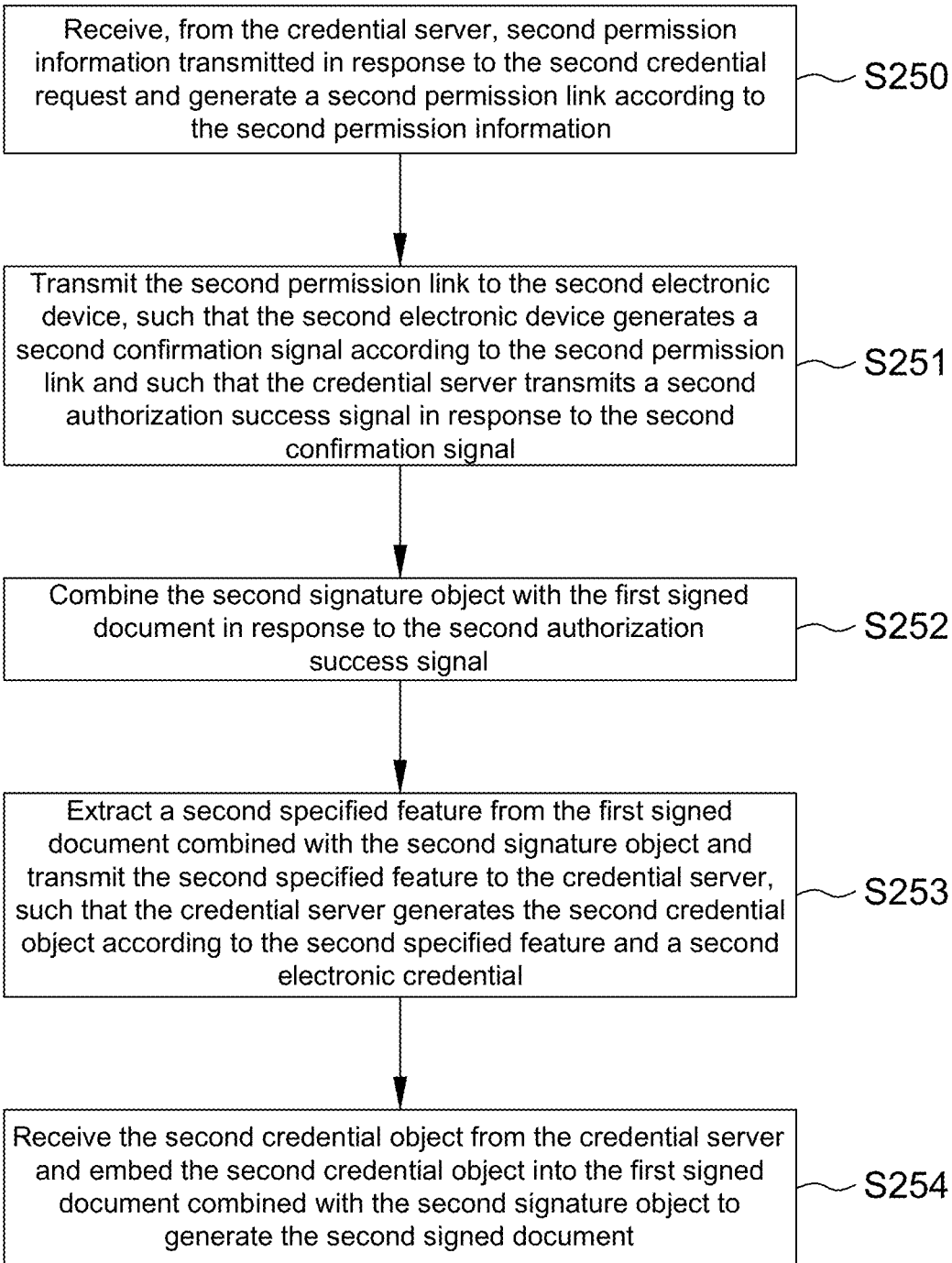

Receive, from the credential server, second permission information transmitted in response to the second credential request and generate a second permission link according to the second permission information — S250

Transmit the second permission link to the second electronic device, such that the second electronic device generates a second confirmation signal according to the second permission link and such that the credential server transmits a second authorization success signal in response to the second confirmation signal — S251

Combine the second signature object with the first signed document in response to the second authorization success signal — S252

Extract a second specified feature from the first signed document combined with the second signature object and transmit the second specified feature to the credential server, such that the credential server generates the second credential object according to the second specified feature and a second electronic credential — S253

Receive the second credential object from the credential server and embed the second credential object into the first signed document combined with the second signature object to generate the second signed document — S254

FIG. 7B

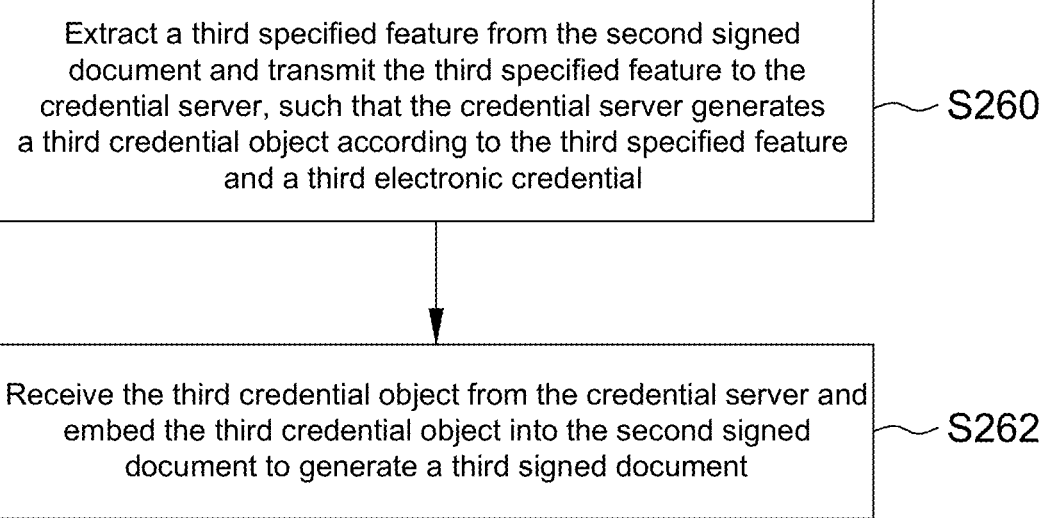

Extract a third specified feature from the second signed document and transmit the third specified feature to the credential server, such that the credential server generates a third credential object according to the third specified feature and a third electronic credential    S260

Receive the third credential object from the credential server and embed the third credential object into the second signed document to generate a third signed document    S262

FIG. 8

SYSTEM, DEVICE AND METHOD FOR EMBEDDING CREDENTIALS ON AN ELECTRONIC DOCUMENT

CROSS-REFERENCE TO RELATED APPLICATION

The present disclosure claims the benefit of and priority to U.S. provisional Patent Application Ser. No. 63/460,700 filed on Apr. 20, 2023, entitled "Online Signature System, Method and Electronic Apparatus," (hereinafter referred to as "the '700 provisional"). The disclosure of the '700 provisional is hereby incorporated fully by reference into the present disclosure.

FIELD

The present invention relates generally to a system, device and method for embedding credentials, and more particularly to a system, device and method for embedding credentials on an electronic document.

BACKGROUND

With the development of global e-commerce, many document or contract reviews and signature execution are no longer limited to paper documents, and the paper documents have been gradually replaced by electronic documents. However, when an electronic document requires signatures from multiple parties online, ensuring the uniqueness, non-repudiation, reliability, and integrity of the signed electronic document is one of the current issues to be resolved.

SUMMARY

The system for embedding credentials on an electronic document according to the present disclosure includes a task assignment device, a document database, a signature server, a credential server, a first electronic device and a second electronic device. The task assignment device is configured to generate an assigned task according to an assignment document. The document database is configured to store the assignment document. The signature server is configured to receive the assigned task from the task assignment device and generate at least a first signature request and a second signature request according to the assigned task. The credential server is configured to store at least a first electronic credential and a second electronic credential. The first electronic device is configured to receive the first signature request from the signature server, generate first signature information according to the first signature request, and transmit the first signature information to the signature server. The signature server is further configured to transmit a first credential request to the credential server according to the first signature information. The credential server is further configured to initiate a first credential authorization process, in response to the first credential request, to generate and transmit a first credential object to the signature server. The first credential object is generated according to the first electronic credential. The signature server is further configured to receive the first credential object, embed the first credential object into the assignment document to generate a first signed document, and store the first signed document in the document database. The second electronic device is configured to receive the second signature request from the signature server, generate second signature information according to the second signature request, and transmit the second signature information to the signature server. The signature server is further configured to transmit a second credential request to the credential server according to the second signature information. The credential server is further configured to initiate a second credential authorization process, in response to the second credential request, to generate and transmit a second credential object to the signature server. The second credential object is generated according to the second electronic credential. The signature server is further configured to receive the second credential object and embed the second credential object into the first signed document to generate a second signed document.

In the system of an embodiment according to the present disclosure, the first signature information includes a first identity verification information, and the second signature information includes a second identity verification information. The signature server is further configured to verify whether the first identity verification information is correct, transmit the first credential request to the credential server after verifying that the first identity verification information is correct, verify whether the second identity verification information is correct, and transmit the second credential request to the credential server after verifying that the second identity verification information is correct.

In the system of an embodiment according to the present disclosure, the credential server is further configured to transmit first permission information in response to the first credential request in the first credential authorization procedure. The signature server is further configured to receive the first permission information, generate a first permission link according to the first permission information, and transmit the first permission link to the first electronic device. The first electronic device is further configured to generate a first confirmation signal according to the first permission link and transmit the first confirmation signal to the credential server. The credential server is further configured to receive the first confirmation signal and transmit the first credential object to the signature server in response to the first confirmation signal.

In the system of an embodiment according to the present disclosure, the credential server is further configured to transmit second permission information in response to the second credential request in the second credential authorization procedure. The signature server is further configured to receive the second permission information, generate a second permission link according to the second permission information, and transmit the second permission link to the second electronic device. The second electronic device is further configured to generate a second confirmation signal according to the second permission link and transmit the second confirmation signal to the credential server. The credential server is further configured to receive the second confirmation signal and transmit the second credential object to the signature server in response to the second confirmation signal.

In the system of an embodiment according to the present disclosure, the first electronic device has a first display and a first input unit and is further configured to display the assignment document on the first display and receive a first input via the first input unit to generate a first signature object on the assignment document. The first signature information further includes the first signature object. The second electronic device has a second display and a second input unit and is further configured to display the first signed document on the second display and receive a second input via the second input unit to generate a second signature object on the first signed document. The second signature information includes the second signature object.

In the system of an embodiment according to the present disclosure, the credential server is further configured to transmit first permission information in response to the first credential request in the first credential authorization procedure. The signature server is further configured to receive the first permission information. The signature server is further configured to generate a first permission link according to the first permission information and transmit the first permission link to the first electronic device. The first electronic device is further configured to generate a first confirmation signal according to the first permission link and transmit the first confirmation signal to the credential server. The credential server is further configured to receive the first confirmation signal and transmit a first authorization success signal to the signature server in response to the first confirmation signal. In response to the first authorization success signal, the signature server is further configured to combine the first signature object with the assignment document and extract a first specified feature from the assignment document combined with the first signature object and transmit the first specified feature to the credential server.

In the system of an embodiment according to the present disclosure, the credential server is further configured to transmit second permission information in response to the second credential request in the second credential authorization procedure. 該 The signature server is further configured to receive the second permission information, generate a second permission link according to the second permission information, and transmit the second permission link to the second electronic device. The second electronic device is further configured to generate a second confirmation signal according to the second permission link and transmit the second confirmation signal to the credential server. The credential server is further configured to receive the second confirmation signal and transmit a second authorization success signal to the signature server in response to the second confirmation signal. In response to the second authorization success signal, the signature server is further configured to combine the second signature object with the first signed document and extract a second specified feature from the first signed document combined with the second signature object and transmit the second specified feature to the credential server. The credential server is further configured to: generate the first credential object according to the first specified feature and the first electronic credential and transmit the first credential object to the signature server; and generate the second credential object according to the second specified feature and the second electronic credential and transmit the second credential object to the signature server. The signature server is further configured to: receive the first credential object from the credential server and embed the first credential object into the assignment document combined with the first signature object to generate the first signed document; and receive the second credential object from the credential server and embed the second credential object into the first signed document combined with the second signature object to generate the second signed document.

In the system of an embodiment according to the present disclosure, the credential server is further configured to store a third electronic credential. The signature server is further configured to extract a third specified feature from the second signed document and transmit the third specified feature to the credential server. The credential server is further configured to generate a third credential object according to the third specified feature and the third electronic credential and transmit the third credential object to the signature server. The signature server is further configured to receive the third credential object from the credential server and embed the third credential object into the second signed document to generate a third signed document.

The method for embedding credentials on an electronic document comprises: receiving an assigned task and generating at least a first signature request and a second signature request according to the assigned task, wherein the assigned task is associated with an assignment document; transmitting the first signature request to a first electronic device, such that the first electronic device generates first signature information according to the first signature request; receiving the first signature information from the first electronic device and transmitting a first credential request to a credential server according to the first signature information, such that the credential server initiates a first credential authorization procedure in response to the first credential request to generate and transmit a first credential object; receiving the first credential object from the credential server and embedding the first credential object into the assignment document to generate a first signed document; transmitting the second signature request to a second electronic device, such that the second electronic device generates second signature information according to the second signature request; receiving the second signature information from the second electronic device and transmitting a second credential request to the credential server according to the second signature information, such that the credential server initiates a second credential authorization procedure in response to the second credential request to generate and transmit a second credential object; and receiving the second credential object from the credential server and embedding the second credential object into the first signed document to generate a second signed document.

In the method of an embodiment according to the present disclosure, the first signature information includes a first identity verification information, and the second signature information includes a second identity verification information. The method further comprises: verifying whether the first identity verification information is correct; transmitting the first credential request to the credential server after verifying that the first identity verification information is correct; verifying whether the second identity verification information is correct; and transmitting the second credential request to the credential server after verifying that the second identity verification information is correct.

The method of an embodiment according to the present disclosure further comprises: in the first credential authorization procedure, receiving, from the credential server, first permission information transmitted in response to the first credential request and generating a first permission link according to the first permission information; and transmitting the first permission link to the first electronic device, such that the first electronic device generates a first confirmation signal according to the first permission link and such that the credential server transmits the first credential object in response to the first confirmation signal.

The method of an embodiment according to the present disclosure further comprises: in the second credential authorization procedure, receiving, from the credential server, second permission information transmitted in response to the second credential request and generating a second permission link according to the second permission information; and transmitting the second permission link to the second electronic device, such that the second electronic device generates a second confirmation signal according to the second permission link and such that the credential server transmits the second credential object in response to the second confirmation signal.

In the method of an embodiment according to the present disclosure, the first signature information further includes a first signature object generated by the first electronic device on the assignment document, and the second signature information further includes a second signature object generated by the second electronic device on the first signed document. The method further comprises: in the first credential authorization procedure, receiving, from the credential server, first permission information transmitted in response to the first credential request and generating a first permission link according to the first permission information; transmitting the first permission link to the first electronic device, such that the first electronic device generates a first confirmation signal according to the first permission link and such that the credential server transmits a first authorization success signal in response to the first confirmation signal; combining the first signature object with the assignment document in response to the first authorization success signal; extracting a first specified feature from the assignment document combined with the first signature object and transmitting the first specified feature to the credential server, such that the credential server generates the first credential object according to the first specified feature and a first electronic credential; and receiving the first credential object from the credential server and embedding the first credential object into the assignment document combined with the first signature object to generate the first signed document.

The method of an embodiment according to the present disclosure further comprises: in the second credential authorization procedure, receiving, from the credential server, second permission information transmitted in response to the second credential request and generating a second permission link according to the second permission information; transmitting the second permission link to the second electronic device, such that the second electronic device generates a second confirmation signal according to the second permission link and such that the credential server transmits a second authorization success signal in response to the second confirmation signal; combining the second signature object with the first signed document in response to the second authorization success signal; extracting a second specified feature from the first signed document combined with the second signature object and transmitting the second specified feature to the credential server, such that the credential server generates the second credential object according to the second specified feature and a second electronic credential; and receiving the second credential object from the credential server and embedding the second credential object into the first signed document combined with the second signature object to generate the second signed document.

The method of an embodiment according to the present disclosure further comprises: extracting a third specified feature from the second signed document and transmitting the third specified feature to the credential server, such that the credential server generates a third credential object according to the third specified feature and a third electronic credential; and receiving the third credential object from the credential server and embedding the third credential object into the second signed document to generate a third signed document.

Another embodiment of the present disclosure further provides a device for embedding credentials on an electronic document. The device comprises a storage component configured to store one or more instructions and a processor electrically coupled to the storage element and configured to execute the one or more instructions to perform the method of the present disclosure.

BRIEF DESCRIPTION OF THE DRAWINGS

In order to make the above and other objects, features, advantages and embodiments of the present disclosure more readily understood, the accompanying drawings are described as follows:

FIG. 5 is a flowchart illustrating a method for embedding credentials on an electronic document according to a first embodiment of the present disclosure.

FIG. 6A and FIG. 6B are flowcharts illustrating a method for embedding credentials on an electronic document according to a second embodiment of the present disclosure.

FIG. 7A and FIG. 7B are flowcharts illustrating a method for embedding credentials on an electronic document according to a third embodiment of the present disclosure.

FIG. 8 is a flowchart illustrating a method for embedding credentials on an electronic document according to a fourth embodiment of the present disclosure.

DETAILED DESCRIPTION OF THE PREFERRED EMBODIMENTS

In the present disclosure, "a," "an," and "the" may refer to a singular form or a plural form, unless an article is specifically restricted to be a singular form in the context.

In addition, as used herein, the terms "comprise/comprising," "include/including," "have/having," and the like are open-ended terms that imply the inclusion of the disclosed features, elements and/or components, but do not preclude the presence or addition of one or more other features, elements, components, and/or groups thereof.

The term "coupled" used in the present disclosure may indicate that two or more elements or devices are in direct physical contact with each other or in indirect physical contact with each other, and may also indicate that two or more elements or devices cooperate or interact with each other.

Furthermore, the ordinal terms (such as "first," "second," "third," and the like) used in the present disclosure and claims are used to modify an element itself and do not imply any priority or any order of one element over another element, or do not imply a chronological order of steps of a method performed, but are used only as symbols to distinguish a claimed element having a particular name from another element having the same name.

The spirit of the present disclosure will be clearly illustrated with drawings and detailed descriptions below. After understanding the embodiments of the present disclosure, those skilled in the art with ordinary knowledge can make modifications and variations based on the technologies taught in the present disclosure without departing from the spirit and scope of the present disclosure.

Figure 1:
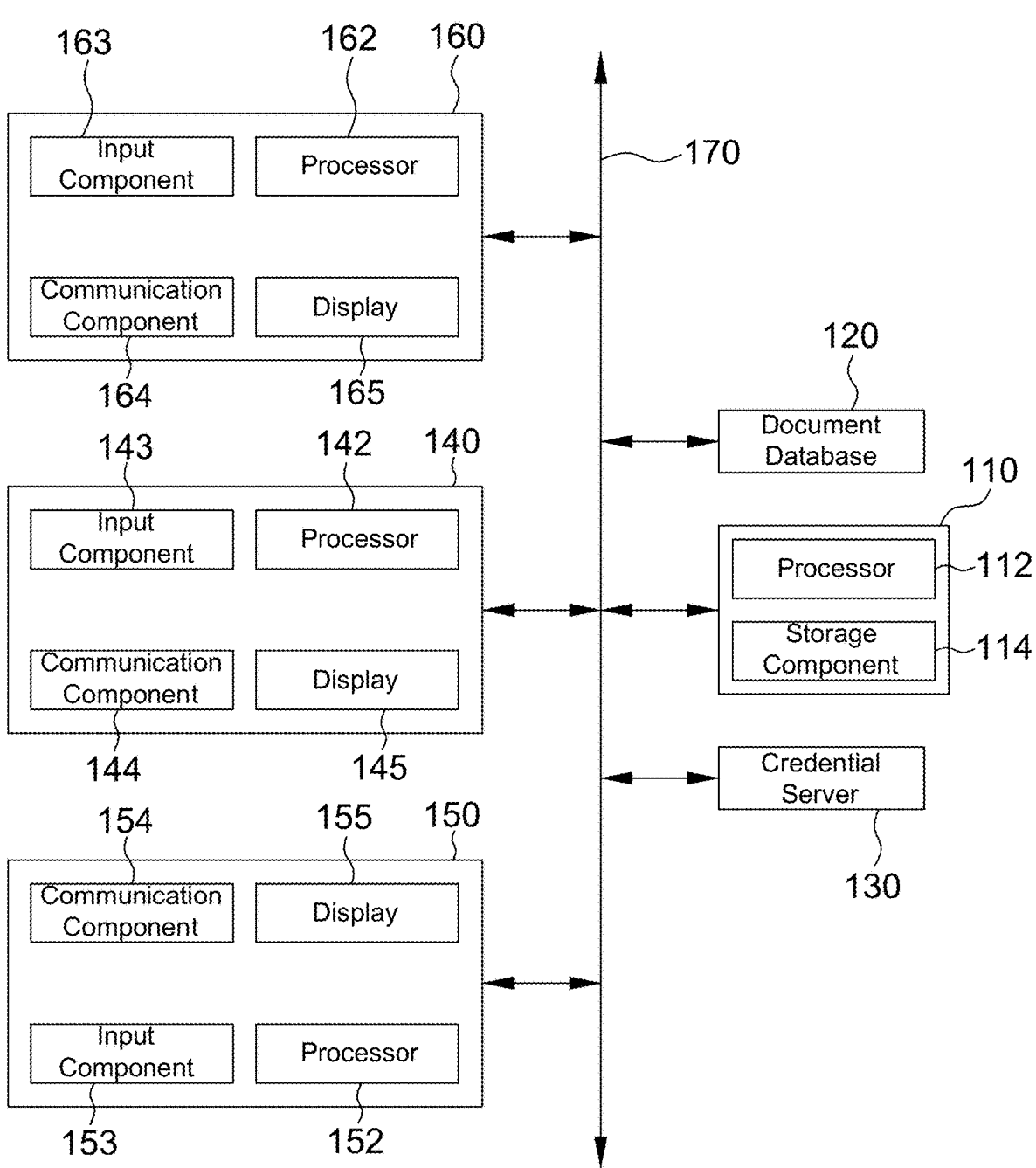
FIG. 1 is a schematic diagram illustrating an architecture of a system for embedding credentials on an electronic document according to an embodiment of the present disclosure.

FIG. 1 is a schematic diagram illustrating an architecture of a system 100 for embedding credentials on an electronic document according to an embodiment of the present disclosure. Referring to FIG. 1, the system 100 for embedding credentials in electronic documents includes a signature server 110, a document database 120, a credential server 130, a task assignment device 140, a first electronic device 150, and a second electronic device 160. The signature server 110, the document database 120, and the credential server 130 are electronic devices having computing and networking functions and provide services through a network 170. The signature server 110 is configured to provide an online electronic document signing service. The document database 120 is configured to store electronic documents. The credential server 130 is configured to store electronic credentials of natural persons and corporate entities and provide an electronic credential management service. The signature server 110 and the document database 120 may be two independent cloud servers or may be arranged in the same cloud server.

The signature server 110 is configured to receive an assigned task from the task assignment device 140 and generate a signature request based on the assigned task. The signature server 110 is an electronic device or server with computing and networking functions. In an embodiment of the present disclosure, the signature server 110 includes at least a processor 112 and a storage component 114. The processor 112 is electrically coupled to the storage component 114. The storage component 114 is configured to store one or more instructions, and the processor 112 is configured to execute the one or more instructions to perform steps in the method for embedding credentials on an electronic document provided by the present disclosure.

The document database 120 is, for example, a server providing an object storage service for storing assignment documents. The assignment document may be any document that needs to be signed. In an embodiment, the document database 120 employs Amazon Simple Storage Service to store and protect arbitrary amounts of data suitable for various use cases, such as data lakes, websites, mobile applications, backup and restore, archives, enterprise applications, Internet of things (IoT) devices, and big data analytics.

The credential server 130 is provided, for example, by a third-party credential authority and configured based on Public Key Infrastructure (PKI) to store electronic credentials and adopt PKI technology to issue electronic credentials. The PKI architecture includes users, a certification authority (CA), a repository and a registration authority (RA). A user is a person or organization that uses PKI. The certification authority (CA) is a person or organization that issues credentials. The repository is a database that stores electronic credentials. The registration authority (RA) provides registration mechanisms. In an embodiment, the credential server 130 may include at least some or all of the functions provided by the certification authority (CA), the repository, and the registration authority (RA). After being verified by third-party credential authority, a signature object may have unique identifiability and integrity.

The task assignment device 140 includes a processor 142, an input component 143, a communication component 144, and a display 145. The processor 142 is electrically coupled to the input component 143, the communication component 144, and the display 145. The assignment device 140 may further include a storage component (not shown) for storing data and programs. The hardware architecture of the task assignment device 140 is similar to that of the first electronic device 150 (or the second electronic device 160) and is used by a task creator to generate an assigned task. In an embodiment, the first electronic device 150 (or the second electronic device 160) and the task assignment device 110 are implemented by the same electronic device. That is, in a case where the electronic device is used by the task creator, the electronic device may serve as the task assignment device 110. In a case where the electronic device is used by a signer, the electronic device may serve as the first electronic device 150 (or the second electronic device 160). In another embodiment, the first electronic device 150 (or the second electronic device 160) and the task assignment device 110 may be implemented by two independent electronic devices.

The task assignment device 140 is configured to assign documents and configure signer information. That is, the task creator assigns a document to be signed as an assignment document through the task assignment 140 and sets signer information to determine which signers (a plurality of signers) to sign the assignment document. When the signer information includes a plurality of signers, the task assignment device 140 further sets a signing sequence in the assigned task.

Figure 2:
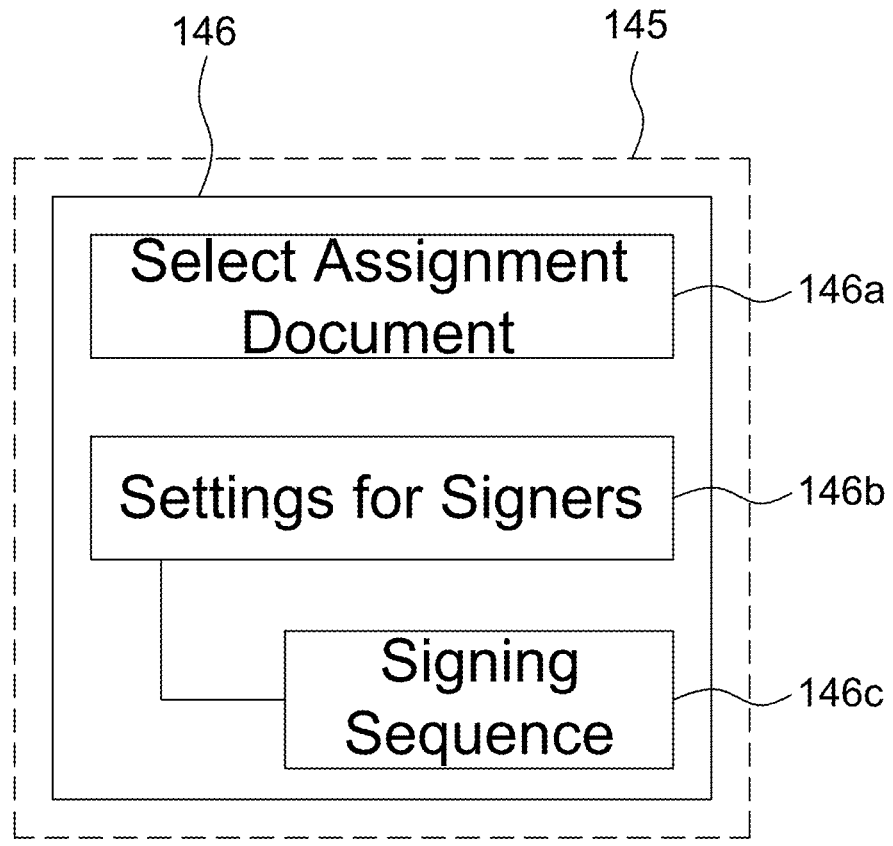
FIG. 2 is a schematic diagram illustrating a task creation interface provided by a signature server according to an embodiment of the present disclosure.

In an embodiment, the task assignment device 140 may first connect to the signature server 110 via the communication component 144 for accessing a task creation interface 146 provided by the signature server 110 and display the task creation interface 146 on the display 145, as shown in FIG. 2. The task creator must register with the signature server 110 in advance. After the task assignment device 140 is connected to the signature server 110 and displays the task creation interface 146, the signature server 110 further verifies whether the task creator using the task assignment device 140 has an access right to use the document database 120. After the signature server 110 verifies that the task assignment device 140 has the access right to use the document database 120, the task creator can assign and generate an assignment document through the task creation interface 146. The task creation interface 146 includes selection items 146a, 146b, 146c. The selection item 146a is used to select an assignment document. The assignment document may be selected in a data folder stored in the task assignment device 140. After the assignment document is selected, the assignment document is uploaded to the document database 120 by the task assignment device 140. In addition, the document database 120 classifies and archives the assignment document to generate a corresponding document identification code and provides the document identification code to the task assignment device 140.

In another embodiment, after the signature server 110 verifies that the task assignment device 140 has the access right to use the document database 120, the assignment document may also be provided by the document database 120. For example, a document selection page may be provided by the document database 120 for the task creator to use the task assignment device 140 to select the assignment document. After the task creator presses the selection item 146a, the task assignment device 140 may link to a document selection page provided by the document database

120 to select the assignment document. That is, a plurality of documents are stored in the document database 120, and each document has a corresponding document identification code. After the task assignment device 140 links to the document selection page, the task creator can use the task assignment device 140 to select one of the documents as the assignment document. Thereafter, the document database 120 may provide the document identification code corresponding to the assignment document to the task assignment device 140.

Next, the task assignment device 140 sets a plurality of signers (signer information) through the selection item 146b and sets a signing order through the selection item 146c. Then, the task assignment device 140 generates an assigned task based on the document identification code corresponding to the assignment document and the signer information and transmits the assigned task to the signature server 110. In an embodiment, the assigned task is associated with an assignment document and/or signer information of at least one signer. For example, the assigned task may include a document identification code, signer information, signing sequence information, and/or signing field information. The document identification code may correspond to an assignment document stored in the document database 120. The signer information may include contact information of at least two signers. The contact information of each signer includes, for example, an identity number (e.g., APP ID) of an application provided by the signature server and used by each signer, an email address, etc. of each signer. The signing sequence information includes a signing sequence of the at least two signers to sign the assignment document. The signing field information includes information related to signature fields in the document that need to be signed by the at least two signers (e.g., position information of signature fields in the assignment document). Accordingly, the signature server 110 may transmit the signature request to an assigned first electronic device 150 and an assigned second electronic device 160 based on the assigned task.

The first electronic device 150 includes a processor 152, an input component 153, a communication component 154, and a display 155. The processor 152 is electrically coupled to the input component 153, the communication component 154, and the display 155. The first electronic device 150 may further include a storage component (not shown) for storing data and programs.

The second electronic device 160 includes a processor 162, an input component 163, a communication component 164, and a display 165. The processor 162 is electrically coupled to the input component 163, the communication component 164, and the display 165. The second electronic device 160 may further include a storage component (not shown) for storing data and programs.

The processors 112, 142, 152, 162 may be, for example, a central processing unit (CPU), a physics processing unit (PPU), a programmable microprocessor, an embedded controlling chip, a digital signal processor (DSP), an application specific integrated circuit (ASIC), or that like.

The storage component 114 and the storage components (not shown) of other devices may be any type of fixed or removable random access memory (RAM), read-only memory (ROM), flash memory, hard disk, or other similar device, or a combination of these devices.

The communication components 144, 154, 164 and the communication components (not shown) of other devices may be chips or circuits that employ the local area network (LAN) technology, the wireless LAN (WLAN) technology, or the mobile communication technology. The LAN technology, for example, is Ethernet. The WLAN technology, for example, is Wi-Fi. The mobile communication technology, for example, is the global system for mobile communications (GSM) technology, the third-generation (3G) technology, the fourth-generation (4G) technology, the fifth-generation (5G) technology, or the like.

The displays 145, 155, 165 and the displays (not shown) of other devices are, for example, a liquid crystal display (LCD), a plasma display (PDP), an organic Light-Emitting diode (OLED) display, or the like.

In addition, the document database 120 and the credential server 130 each have a processor, a storage component, and a communication component (not shown but similar to the above-mentioned processors 112, 142, 152, 162, storage component 114, and communication components 144, 154, 164).

Figure 3A:
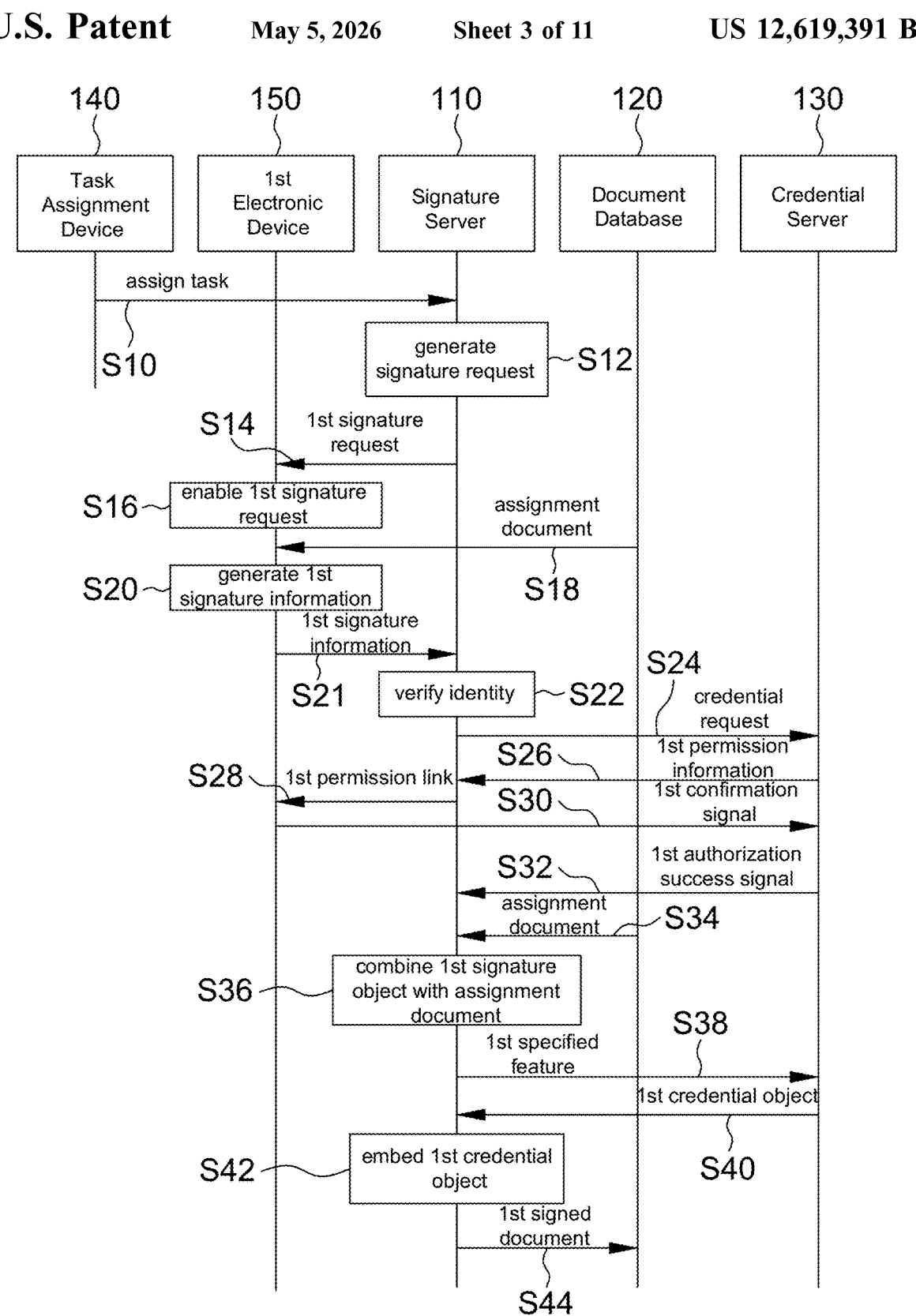
FIG. 3A and FIG. 3B are flowcharts illustrating a method for embedding credentials on an electronic document according to an embodiment of the present disclosure.
Figure 3B:
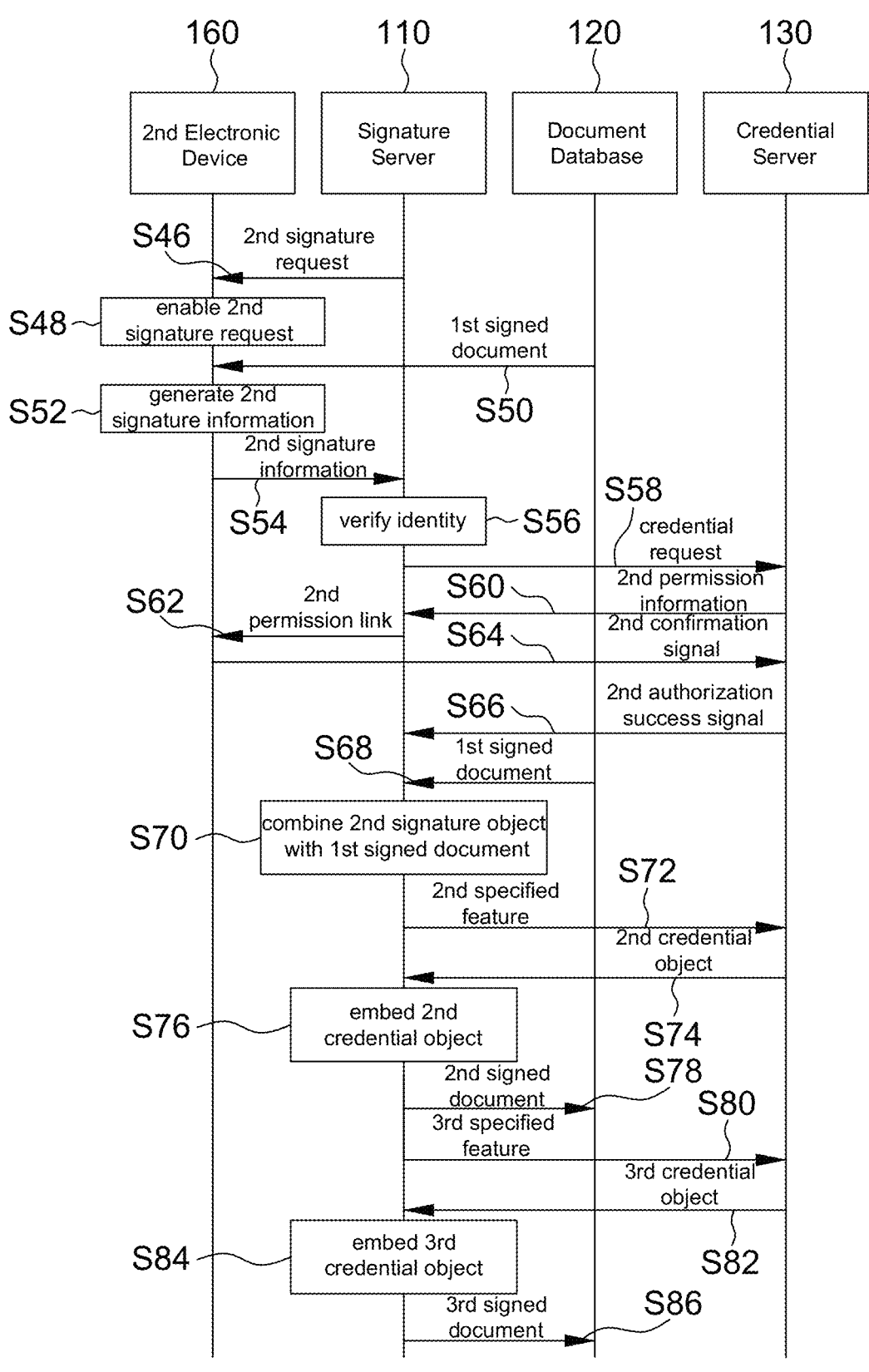
Figures 4A, 4B:
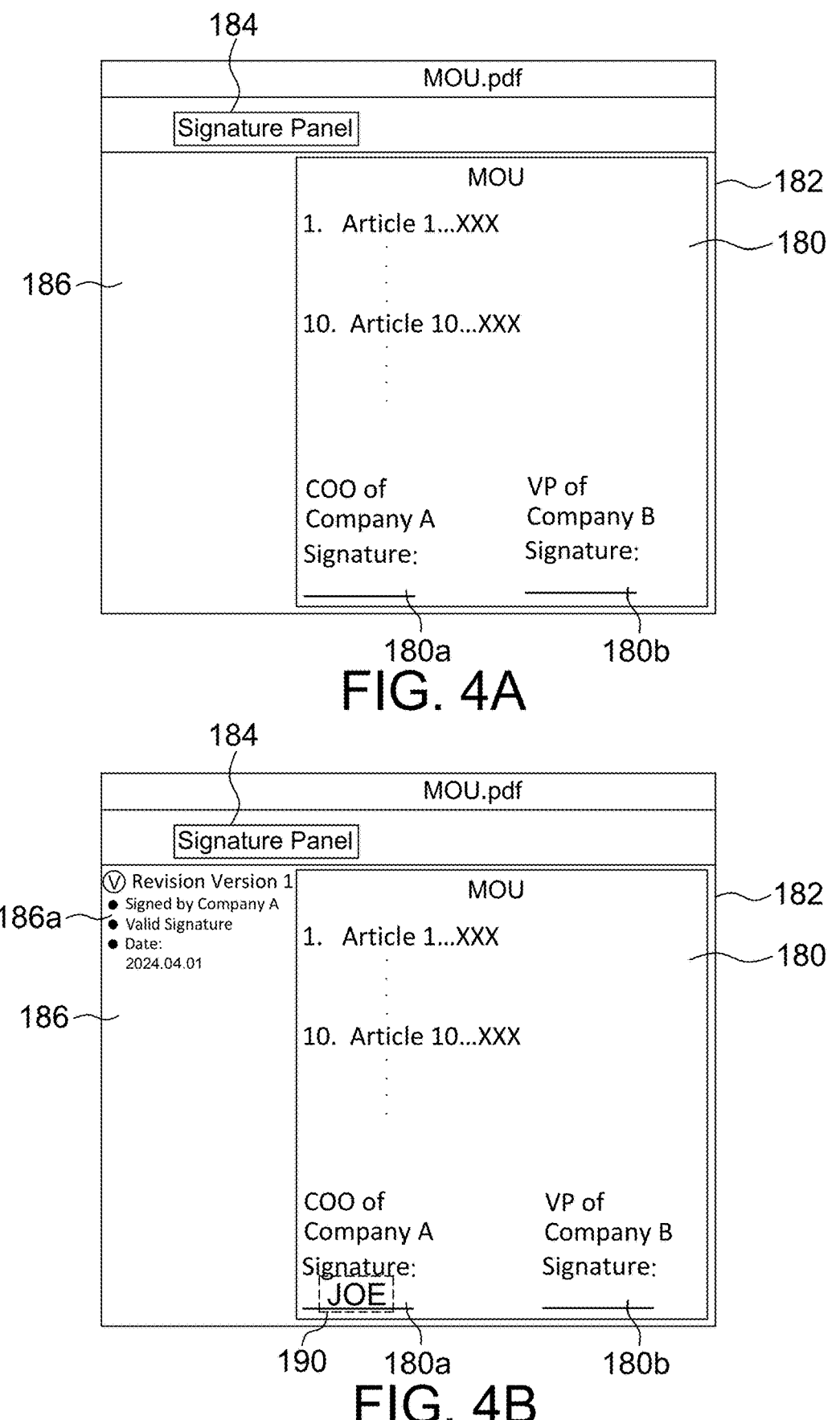
FIGS. 4A-4D are schematic diagrams illustrating an assignment document sequentially signed by different signers and presented on a reading application according to an embodiment of the present disclosure.

FIG. 3A and FIG. 3B are flowcharts illustrating a method for embedding credentials on an electronic document according to an embodiment of the present disclosure. Referring to FIG. 1, FIG. 2, FIG. 3A and FIG. 3B, in step S10, the task assignment device 140 connects to the signature server 110 for accessing the task creation interface 146 provided by the signature server 110, sets a plurality of signers (signer information) and selects an assignment document through the task creation interface 146, and then generates an assigned task according to the assignment document and the signer information and transmits the assigned task to the signature server 110. For example, a task creator selects, for example, a memorandum of understanding (MOU) document for cooperation 180 (as shown in FIG. 4A) as an assignment document by using the task assignment device 140 and has previously uploaded the assignment document 180 to the document database 120 through the task creation interface 146 or has previously selected the assignment document 180 in the document database 120 through the task creation interface 146. In addition, the task creator uses the task assignment device 140 to set a first signer and a second signer. The first signer is a user of the first electronic device 150 and is, for example, a chief operating officer (COO) of Company A. The second signatory is a user of the second electronic device 160 and is, for example, a VP of Company B. In the present embodiment, the assigned task is associated with an assignment document and/or signer information of at least one signer. For example, the assigned task may include a document identification code, signer information, signing sequence information, and/or field information.

In step S12, the signature server 110 receives the assigned task from the task assignment device 140 and generates a signature request based on the assigned task. In the present embodiment, the signature request includes a first signature request and a second signature request.

In step S14, the signature server 110 transmits the first signature request to the first electronic device 150.

In step S16, the first electronic device 150 receives the first signature request from the signature server 110 and enables the first signature request. In the present embodiment, the first signature request is, for example, a Uniform Resource Locator (URL) address, and the first electronic device 150 can enable the first signature request according to a click operation of the input component 153 (e.g., a mouse, a touch panel, or a handwriting tablet) on the URL address. In addition, the first signature request may include at least one of the following pieces of information: a task identifier representing an assigned task, a document identification code representing an assignment document assigned in the assigned task, at least one signer identifier representing each signer assigned by the assigned task, at least one email address representing an email address corresponding to each signer, at least one APP ID representing an APP ID of each signer on the application, and an expiration date representing a validity period of the signature request.

In step S18, after enabling the first signature request, the first electronic device 150 may download the assignment document from the document database 120 based on the first signature request to display the assignment document on the display 155. In the present embodiment, the assignment document may be, for example, a memorandum of understanding (MOU) document for cooperation 180 as shown in FIG. 4A and may be opened by a document reading application 182 installed on the first electronic device 150 or opened by any electronic device installed with the document reading application 182.

In step S20, after downloading the assignment document, the first electronic device 150 generates first signature information according to the first signature request. In the present embodiment of the present disclosure, the first signature information may include first identity verification information and a signature object corresponding to a handwritten signature of the user of the first electronic device 150. For example, the user of the first electronic device 150 is the Chief Operating Officer (COO), whose name is JOE, of Company A. The COO of Company A may sign on a first signature field 180a (as shown in FIG. 4A) of the MOU 180 through the input component 153 (e.g., a mouse, a touch panel or a handwriting tablet) of the first electronic device 150 to generate a first signature object 190 (e.g., JOE) on the MOU 180, as shown in FIG. 4B. The first signature object is, for example, a handwritten signature track or image. For example, in a case where the input component 153 is implemented by using a handwriting tablet or touch panel, the first signature object may be a handwritten signature track. In a case where the input component 153 is implemented by an image capture device, the first signature object may be a stamp image or a handwritten signature image. In addition, the first identity verification information may be identity information of a natural person credential or company information of an industrial and commercial credential of the user of the first electronic device 150 and may be generated by reading from a natural person credential chip card or an industrial and commercial credential chip card via the input component 153 (e.g., a card reader). In another embodiment of the present disclosure, the first signature information may include the first identity verification information without including any signature object. For example, in an assignment task of another embodiment according to the present disclosure, the user of the first electronic device 150 does not need to sign the assignment document by handwriting but can provide his/her identity verification information (i.e., the first identity verification information) to the signature server 110 through the input component 153 (e.g., a card reader), thus authorizing the signature server 110 to embed his/her electronic credential into the assignment document to complete his/her signature task for the assignment document.

In step S21, the first electronic device 150 transmits the first signature information to the signature server 110.

In step S22, the signature server 110 receives the first signature information from the first electronic device 150 and verifies whether first identity verification information included in the first signature information is correct to determine whether the user of the first electronic device 150 is an authorized signer.

In step S24, after verifying that the first identity verification information is correct, the signature server 110 transmits a first credential request to the credential server 130 according to the first signature information. The credential server 130 initiates a first credential authorization process in response to the first credential request. In the present embodiment of the present disclosure, the first credential authorization procedure includes steps S26-S40. In another embodiment of the present disclosure, when the first signature information does not include any signature object, the first credential authorization procedure only includes steps S26, S28, S30, S32, and S40. In other embodiments of the present disclosure, the credential server 130 does not initiate the first credential authorization process and may transmit a first credential object to the signature server 110 in step S40 in response to the first credential request.

In step S26, the credential server 130 generates first permission information in response to the first credential request and transmits the first permission information to the signature server 110.

In step S28, after the signature server 110 receives the first permission information from the credential server 130, the signature server 110 generates a first permission link according to the first permission information and transmits the first permission link to the first electronic device 150. In the present embodiment, the first permission link is, for example, a URL address and transmitted to the first electronic device 150 via an email.

In step S30, after the first electronic device 150 receives the first permission link from the signature server 110, the first electronic device 150 generates a first confirmation signal according to the first permission link and transmits the first confirmation signal to the credential server 130. In the present embodiment, the first electronic device 150 can generate the first confirmation signal according to a click operation of the input component 153 (e.g., a mouse, a touch panel, or a handwriting tablet) on the URL address.

In step S32, the credential server 130 transmits a first authorization success signal to the signature server 110 in response to the first confirmation signal.

In step S34, the signature server 110 downloads the assignment document from the document database 120 in response to the first authorization success signal.

In step S36, the signature server 110 combines the first signature object with the assignment document in response to the first authorization success signal.

In step S38, the signature server 110 extracts a first specified feature from the assignment document combined with the first signature object and transmits the first specified feature to the credential server 130. In an embodiment of the disclosure, the first specified feature comprises a hash value or other information in the document. In other embodiments of the present disclosure, the first specified feature may be generated for the assignment document combined with the first signature object by using X.509 credential standard.

In step S40, the credential server 130 generates a first credential object according to the first specified feature and a first electronic credential.

In step S42, the signature server 110 receives the first credential object from the credential server 130 and embeds the first credential object into the assignment document to generate a first signed document.

In step S44, the signature server 110 transmits the first signed document to the document database 120 to store the first signed document in the document database 120.

In step S46, after the first signed document is stored in the document database 120, the signature server 110 transmits the second signature request to the second electronic device 160.

In step S48, the second electronic device 160 receives the second signature request from the signature server 110 and enables the second signature request. In the present embodiment, the second signature request is, for example, a Uniform Resource Locator (URL) address, and the second electronic device 160 can enable the second signature request according to a click operation of the input component 163 (e.g., a mouse, a touch panel, or a handwriting tablet) on the URL address. In addition, the second signature request may include at least one of the following pieces of information: a task identifier representing an assigned task, a document identification code representing an assignment document assigned in the assigned task, at least one signer identifier representing each signer assigned by the assigned task, at least one email address representing an email address corresponding to each signer, at least one APP ID representing an APP ID of each signer on the application, and an expiration date representing a validity period of the signature request.

In step S50, after enabling the second signature request, the second electronic device 160 may download the first signed document from the document database 120 based on the second signature request to display the first signed document on the display 165. In the present embodiment, the first signed document may be, for example, the memorandum of understanding (MOU) document for cooperation 180 as shown in FIG. 4B and may be opened by a document reading application 182 installed on the second electronic device 160 or opened by any electronic device installed with the document reading application 182. The user interface of the document reading application 182 has an area 186 for presenting all invisible credential objects in the MOU 180. In the present embodiment, the first credential object embedded in the first signed document is an invisible credential object. Therefore, the first credential object in the first signed document can be displayed in a section 186a of the area 186 by selection (e.g., by clicking with a mouse or a touch panel) of a function key (e.g., the signature panel 184 shown in FIG. 4B) presented on the document reading application 182. In the present embodiment, the first credential object presented in section 186a includes, but is not limited to, the name of the signer (e.g., Company A), the validity of the signature (e.g., whether the signature is valid or invalid), and the signing date. In other embodiments of the present invention, the first credential object presented in section 186a may further include information such as a credential serial number, a public Key, a credential expiration date, and a time stamp. In addition, the words "Revision Version 1" presented on the section 186a may be in a document link format, and when the "Revision Version 1" is selected via an input component (e.g., by clicking via a mouse or touch panel), the document reading application 182 may open the assignment document of "Revision Version 1" and present it on a document display area of the document reading application 182.

Figures 4C, 4D:
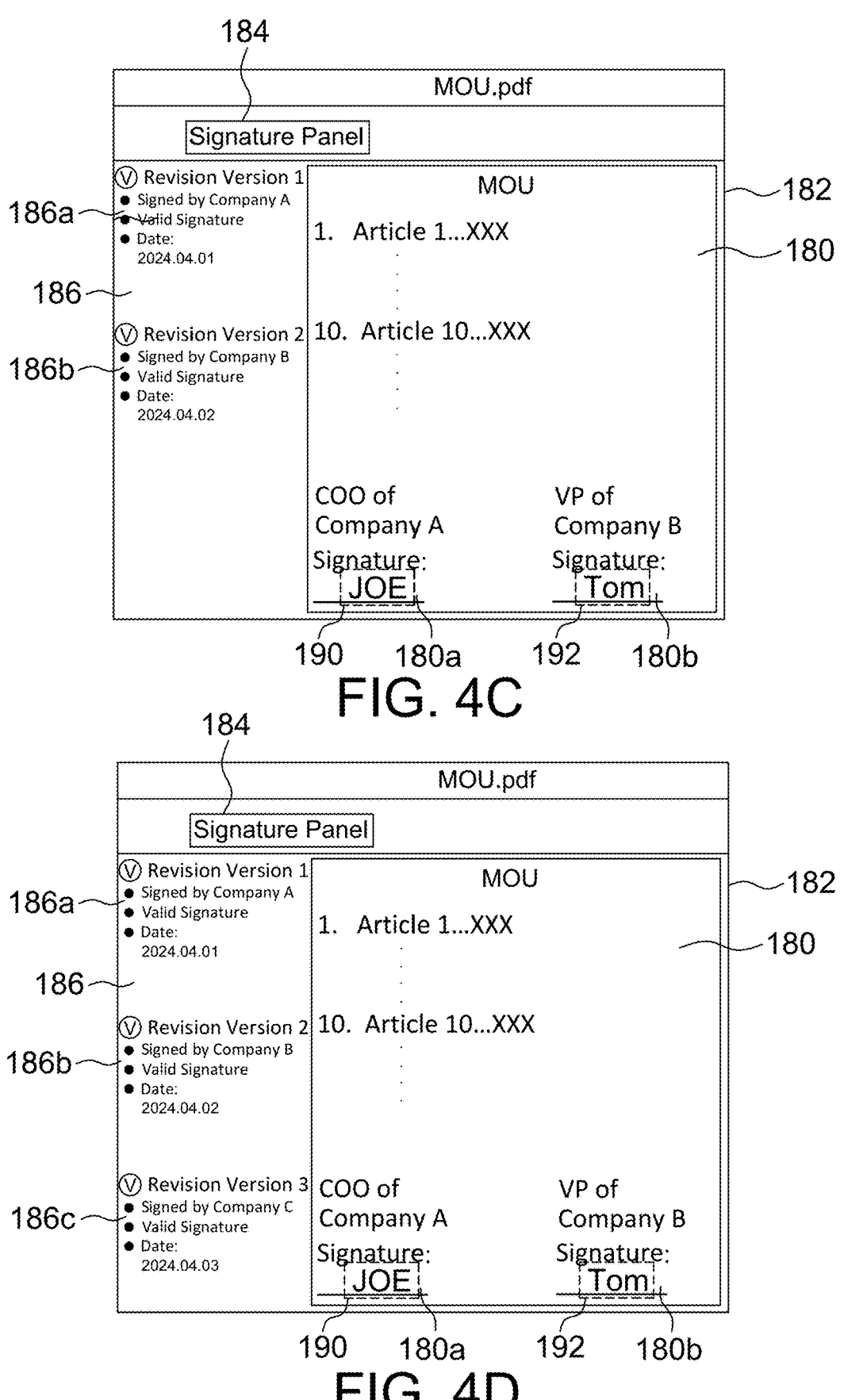

In step S52, after downloading the first signed document, the second electronic device 160 generates second signature information according to the second signature request. In the present embodiment of the present disclosure, the second signature information may include second identity verification information and a signature object corresponding to a handwritten signature of the user of the second electronic device 160. For example, the user of the second electronic device 160 is a VP, whose name is Tom, of Company B. The VP of Company B may sign on a second signature field 180b (as shown in FIG. 4C) of the MOU 180 through the input component 163 (e.g., a mouse, a touch panel or a handwriting tablet) of the second electronic device 160 to generate a second signature object 192 (e.g., Tom) on the MOU 180, as shown in FIG. 4C. The second signature object is, for example, a handwritten signature track or image. For example, in a case where the input component 163 is implemented by using a handwriting tablet or touch panel, the second signature object may be a handwritten signature track. In a case where the input component 163 is implemented by an image capture device, the second signature object may be a stamp image or a handwritten signature image. In addition, the second identity verification information may be identity information of a natural person credential or company information of an industrial and commercial credential of the user of the second electronic device 160 and may be generated by reading from a natural person credential chip card or an industrial and commercial credential chip card via the input component 163 (e.g., a card reader). In another embodiment of the present disclosure, the second signature information may include the second identity verification information without including any signature object. For example, in an assignment task of another embodiment according to the present disclosure, the user of the second electronic device 160 does not need to sign the assignment document by handwriting but can provide his/her identity verification information (i.e., the second identity verification information) to the signature server 110 through the input component 163 (e.g., a card reader), thus authorizing the signature server 110 to embed his/her electronic credential into the assignment document to complete his/her signature task for the assignment document.

In step S54, the second electronic device 160 transmits the second signature information to the signature server 110.

In step S56, the signature server 110 receives the second signature information from the second electronic device 160 and verifies whether second identity verification information included in the second signature information is correct to determine whether a user of the second electronic device 160 is an authorized signer.

In step S58, after verifying that the second identity verification information is correct, the signature server 110 transmits a second credential request to the credential server 130 according to the second signature information. The credential server 130 initiates a second credential authorization process in response to the second credential request. In the present embodiment of the present disclosure, the second credential authorization procedure includes steps S60-S74. In another embodiment of the present disclosure, when the second signature information does not include any signature object, the second credential authorization procedure only includes steps S60, S62, S64, S66, and S74. In other embodiments of the present disclosure, the credential server 130 does not initiate the second credential authorization process and may transmit a second credential object to the signature server 110 in step S74 in response to the second credential request.

In step S60, the credential server 130 generates second permission information in response to the second credential request and transmits the second permission information to the signature server 110.

In step S62, after the signature server 110 receives the second permission information from the credential server 130, the signature server 110 generates a second permission link according to the first permission information and transmits the second permission link to the second electronic device 160. In the present embodiment, the second permission link is, for example, a URL address and transmitted to the second electronic device 160 via an email.

In step S64, after the second electronic device 160 receives the second permission link from the signature server 110, the second electronic device 160 generates a second confirmation signal according to the second permission link and transmits the second confirmation signal to the credential server 130. In the present embodiment, the second electronic device 160 can generate the second confirmation signal according to a click operation of the input component 163 (e.g., a mouse, a touch panel, or a handwriting tablet) on the URL address.

In step S66, the credential server 130 transmits a second authorization success signal to the signature server 110 in response to the second confirmation signal.

In step S68, the signature server 110 downloads the first signed document from the document database 120 in response to the second authorization success signal.

In step S70, the signature server 110 combines the second signature object with the first signed document in response to the second authorization success signal.

In step S72, the signature server 110 extracts a second specified feature from the first signed document combined with the second signature object and transmits the second specified feature to the credential server 130. In an embodiment of the disclosure, the second specified feature comprises a hash value or other information in the document. In other embodiments of the present disclosure, the second specified feature may be generated for the first signed document combined with the second signature object by using X.509 credential standard.

In step S74, the credential server 130 generates a second credential object according to the second specified feature and a second electronic credential.

In step S76, the signature server 110 receives the second credential object from the credential server 130 and embeds the second credential object into the first signed document combined with the second signature object to generate a second signed document. In the present embodiment, the second signed document may be, for example, the memorandum of understanding (MOU) document for cooperation 180 as shown in FIG. 4C and may be opened by a document reading application 182 installed on the second electronic device 160 or opened by any electronic device installed with the document reading application 182. In the present embodiment, the second credential object embedded in the second signed document is an invisible credential object. Therefore, the second credential object in the second signed document can be displayed in a section 186b of the area 186 by selection (e.g., by clicking with a mouse or a touch panel) of a function key (e.g., the signature panel 184 shown in FIG. 4C) presented on the document reading application 182. In the present embodiment, the second credential object presented in section 186b includes, but is not limited to, the name of the signer (e.g., Company B), the validity of the signature (e.g., whether the signature is valid or invalid), and the signing date. In other embodiments of the present invention, the second credential object presented in section 186b may further include information such as a credential serial number, a public Key, a credential expiration date, and a time stamp. In addition, the words "Revision Version 2" presented on the section 186b may be in a document link format, and when the "Revision Version 2" is selected via an input component (e.g., by clicking via a mouse or touch panel), the document reading application 182 may open the assignment document of "Revision Version 2" and present it on a document display area of the document reading application 182.

In step S78, the signature server 110 transmits the second signed document to the document database 120 to store the second signed document in the document database 120.

In step S80, the signature server 110 extracts a third specified feature from the second signed document and transmits the third specified feature to the credential server 130. In an embodiment of the disclosure, the third specified feature comprises a hash value or other information in the document. In other embodiments of the present disclosure, the third specified feature may be generated for the first signed document by using X.509 credential standard.

In step S82, the credential server 130 generates a third credential object according to the third specified feature and a third electronic credential. In the present embodiment, the third electronic credential may be a digital credential belonging to a notary but is not limited thereto.

In an embodiment of the present disclosure, the first credential object, the second credential object and the third credential object are, for example, digital certificate objects. The purpose of a digital certificate object is used to prove that the user listed in the credential legally owns the public key listed in the credential. The digital certificate object may include credential serial number, username, public key, credential validity period, time stamp, etc.

In step S84, the signature server 110 receives the third credential object from the credential server 130 and embeds the third credential object into the second signed document to generate a third signed document. In the present embodiment, the third signed document may be, for example, the memorandum of understanding (MOU) document for cooperation 180 as shown in FIG. 4D and may be opened by a document reading application 182 installed on the second electronic device 160 or opened by any electronic device installed with the document reading application 182. In the present embodiment, the third credential object embedded in the third signed document is an invisible credential object. Therefore, the third credential object in the third signed document can be displayed in a section 186c of the area 186 by selection (e.g., by clicking with a mouse or a touch panel) of a function key (e.g., the signature panel 184 shown in FIG. 4C) presented on the document reading application 182. In the present embodiment, the third credential object presented in section 186c includes, but is not limited to, the name of the signer (e.g., Company C), the validity of the signature (e.g., whether the signature is valid or invalid), and the signing date. In other embodiments of the present invention, the third credential object presented in section 186c may further include information such as a credential serial number, a public Key, a credential expiration date, and a time stamp. In addition, the words "Revision Version 3" presented on the section 186c may be in a document link format, and when the "Revision Version 3" is selected via an input component (e.g., by clicking via a mouse or touch panel), the document reading application 182 may open the assignment document of "Revision Version 3" and present it on a document display area of the document reading application 182.

In step S86, the signature server 110 transmits the third signed document to the document database 120 to store the third signed document in the document database 120.

FIG. 5 is a flowchart illustrating a method for embedding credentials on an electronic document according to a first embodiment of the present disclosure. The method of the present embodiment according to the disclosure can be executed on an electronic device with computing function and networking function. In the first embodiment, the electronic device executing the method of the present disclosure will be described by taking the signature server 110 as an example but not limited thereto.

Referring to FIG. 3A, FIG. 3B and FIG. 5, in step S200, the signature server 110 receives an assigned task from the task assignment device 140 and generates at least a first signature request and a second signature request according to the assigned task. The assignment task is associated with an assignment document, and the assignment document may be stored in the document database 120 or downloaded in advance from the document database 120 to the storage component 114 of the signature server 110.

In step S202, the signature server 110 transmits the first signature request to the first electronic device 150, such that the first electronic device 150 generates first signature information according to the first signature request. In an embodiment, the first signature information includes first identity verification information. In an embodiment, the first identity verification information may be identity information of a natural person credential or company information of an industrial and commercial credential of the user of the first electronic device 150.

In step S204, the signature server 110 receives the first signature information from the first electronic device 150 and verifies whether first identity verification information included in the first signature information is correct to determine whether a user of the first electronic device 150 is an authorized signer.

In step S206, after verifying that the first identity verification information is correct, the signature server 110 transmits a first credential request to the credential server 130 according to the first signature information, such that the credential server 130 initiates a first credential authorization procedure in response to the first credential request to generate and transmit a first credential object.

In step S208, the signature server 110 receives the first credential object from the credential server 130 and embeds the first credential object into an assignment document to generate a first signed document. In an embodiment, the signature server 110 may read an assignment document from the storage component 114 or download the assignment document from a document database, and the signature server 110 may embed the first credential object into the read assignment document or the downloaded assignment document. In addition, the signature server 110 may store the first signed document in the storage component 114 or transmit the first signed document to the document database 120 to store the first signed document in the document database 120.

In step S210, the signature server 110 transmits the second signature request to the second electronic device 160, so that the second electronic device 160 generates second signature information according to the second signature request. In an embodiment, the second signature information includes second identity verification information. In an embodiment, the second identity verification information may be identity information of a natural person credential or company information of an industrial and commercial credential of the user of the second electronic device 160.

In step S212, the signature server 110 receives the second signature information from the second electronic device 160 and verifies whether second identity verification information included in the second signature information is correct to determine whether a user of the second electronic device 160 is an authorized signer.

In step S214, after verifying that the second identity verification information is correct, the signature server 110 transmits a second credential request to the credential server 130 according to the second signature information, such that the credential server 130 initiates a second credential authorization procedure in response to the second credential request to generate and transmit a second credential object.

In step S216, the signature server 110 receives the second credential object from the credential server 130 and embeds the second credential object into the first signed document to generate a second signed document. In an embodiment, the signature server 110 may read the first signed document from the storage component 114 or download the first signed document from a document database, and the signature server 110 may embed the second credential object into the read first signed document or the downloaded first signed document. In addition, the signature server 110 may store the second signed document in the storage component 114 or transmit the second signed document to the document database 120 to store the second signed document in the document database 120.

In a second embodiment of the present disclosure, the method illustrated in FIG. 5 may further include steps S220, S222, S230, and S232 (as shown in FIG. 6A and FIG. 6B). The second embodiment of the present disclosure is used to illustrate the steps performed by the signature server 110 when neither the first electronic device 150 nor the second electronic device 160 generates a signature object on the assignment document. Specifically, when the first electronic device 150 does not generate any signature object on the assignment document, that is, when the user of the first electronic device 150 does not need to execute a handwritten signature on the assignment document, the signature server 110 may further execute steps S220 and S222 in the first credential authorization procedure.

In step S220, the signature server 110 receives, from the credential server 130, first permission information transmitted in response to the first credential request and generates a first permission link according to the first permission information.

In step S222, the signature server 110 transmits the first permission link to the first electronic device 150, such that the first electronic device 150 generates a first confirmation signal according to the first permission link and such that the credential server 130 transmits the first credential object in response to the first confirmation signal.

In addition, when the second electronic device 160 does not generate any signature object on the assignment document, that is, when the user of the second electronic device 160 does not need to execute a handwritten signature on the assignment document, the signature server 110 may further execute steps S230 and S232 in the second credential authorization procedure.

In step S230, the signature server 110 receives, from the credential server 130, second permission information transmitted in response to the second credential request and generates a second permission link according to the second permission information.

In step S232, the signature server 110 transmits the second permission link to the second electronic device 160, such that the second electronic device 160 generates a second confirmation signal according to the second permission link and such that the credential server 130 transmits the second credential object in response to the second confirmation signal.

In a third embodiment of the present disclosure, the method illustrated in FIG. 5 may further include steps S240, S241, S242, S243, S244, S250, S251, S252, S253, and S254 (as shown in FIG. 7A and FIG. 7B). The third embodiment of the present disclosure is used to illustrate the steps performed by the signature server 110 when the first electronic device 150 and the second electronic device 160 sequentially generate signature objects on the assignment document. Specifically, when the user of the first electronic device 150 executes a first handwritten signature on the assignment document, the first signature information further includes a first signature object generated on the assignment document by the first electronic device according to the first handwritten signature, and the signature server 110 may further execute steps S240, S241, S242, S243, and S244 in the first credential authorization procedure.

In step S240, the signature server 110 receives, from the credential server 130, first permission information transmitted in response to the first credential request and generates a first permission link according to the first permission information.

In step S241, the signature server 110 transmits the first permission link to the first electronic device 150, such that the first electronic device 150 generates a first confirmation signal according to the first permission link and such that the credential server 130 transmits a first authorization success signal in response to the first confirmation signal.

In step S242, the signature server 110 combines the first signature object with the assignment document in response to the first authorization success signal.

In step S243, the signature server 110 extracts a first specified feature from the assignment document combined with the first signature object and transmits the first specified feature to the credential server 130, such that the credential server 130 generates the first credential object according to the first specified feature and a first electronic credential.

In step S244, the signature server 110 receives the first credential object from the credential server and embeds the first credential object into the assignment document combined with the first signature object to generate the first signed document.

In addition, when the user of the second electronic device 160 executes a second handwritten signature on the assignment document, the second signature information further includes a second signature object generated on the first signed document by the second electronic device according to the second handwritten signature, and the signature server 110 may further execute steps S250, S251, S252, S253, and S254 in the second credential authorization procedure.

In step S250, the signature server 110 receives, from the credential server 130, second permission information transmitted in response to the second credential request and generates a second permission link according to the second permission information.

In step S251, the signature server 110 transmits the second permission link to the second electronic device 160, such that the second electronic device 160 generates a second confirmation signal according to the second permission link and such that the credential server 130 transmits a second authorization success signal in response to the second confirmation signal.

In step S252, the signature server 110 combines the second signature object with the first signed document in response to the second authorization success signal.

In step S253, the signature server 110 extracts a second specified feature from the first signed document combined with the second signature object and transmits the second specified feature to the credential server 130, such that the credential server 130 generates the second credential object according to the second specified feature and a second electronic credential.

In step S254, the signature server 110 receives the second credential object from the credential server and embeds the second credential object into the first signed document combined with the second signature object to generate the second signed document.

In a fourth embodiment of the present disclosure, the method illustrated in FIG. 5 may further include steps S260 and S262 (as shown in FIG. 8). The signature server 110 may embed a third electronic credential belonging to a notary into the second signed document through steps S260 and S262 to increase the uniqueness and non-repudiation of the document.

In step S260, the signature server 110 extracts a third specified feature from the second signed document and transmits the third specified feature to the credential server 130, such that the credential server 130 generates a third credential object according to the third specified feature and a third electronic credential.

In step S262, the signature server 110 receives the third credential object from the credential server 130 and embeds the third credential object into the second signed document to generate a third signed document.

In an embodiment of the present disclosure, the notary may be the owner of the signature server 110 and has been verified by the credential server 130 as the owner of the third electronic credential or has been previously verified by the credential server 130 prior to the assigned task. Therefore, the signature server 110 can receive the third credential object from the credential server 130 after directly transmitting the third specified feature to the credential server 130 without further executing step of verifying identity or transmitting credential request.

In summary, with the utilization of the system, device and method provided by the present disclosure for embedding credentials on an electronic document, one electronic document may be embedded with electronic credentials belonging to multiple signers and/or include signature objects generated by the handwritten signature of each signer, thus improving reliability of the signed electronic document. In addition, the electronic document signed by multiple parties can finally be embedded with an electronic credential belonging to a notary, such that the uniqueness, non-repudiation and integrity of the signed electronic document can be improved, and the problems existing in the prior art can be solved.

Although the present disclosure has been disclosed by way of above embodiments, the embodiments are not intended to limit the present disclosure, and those skilled in the art will appreciate that changes and modifications may be made therein as long as those changes and modifications do not deviate from the spirit and the scope of the present disclosure. Therefore, the scope of the present disclosure should be construed according to the definitions in the appended claims.

What is claimed is:

1. A system for embedding credentials on an electronic document, the system comprising:
   a task assignment device including a display configured to display a task creation interface for assigning an assignment document and a first processor configured to generate an assigned task according to the assignment document;
   a document database including a first storage component configured to store the assignment document;

a signature server including a second storage component configured to store one or more instructions and a second processor electrically coupled to the second storage component and configured to execute the one or more instructions to receive the assigned task from the task assignment device and generate at least a first signature request and a second signature request according to the assigned task;

a credential server including a third storage component configured to store at least a first electronic credential and a second electronic credential;

a first electronic device including a first communication component configured to receive the first signature request from the signature server and a third processor electronically connected to the first communication component and configured to generate first signature information according to the first signature request, wherein the first communication component is further configured to transmit the first signature information to the signature server, wherein:

the second processor of the signature server is further configured to execute the one or more instructions to transmit a first credential request to the credential server according to the first signature information;

the credential server further includes a fourth processor configured to initiate a first credential authorization process, in response to the first credential request, to generate a first credential object and a second communication component configured to transmit the first credential object to the signature server, wherein the first credential object is generated according to the first electronic credential; and the second processor of the signature server is further configured to execute the one or more instructions to receive the first credential object, embed the first credential object into the assignment document to generate a first signed document, and store the first signed document in the document database; and a second electronic device including a third communication component configured to receive the second signature request from the signature server and a fifth processor electronically connected to the third communication component and configured to generate second signature information according to the second signature request, wherein the third communication component is further configured to transmit the second signature information to the signature server, wherein:

the second processor of the signature server is further configured to execute the one or more instructions to transmit a second credential request to the credential server according to the second signature information;

the fourth processor of the credential server is further configured to initiate a second credential authorization process, in response to the second credential request, to generate a second credential object, the second communication component is further configured to transmit the second credential object to the signature server, and the second credential object is generated according to the second electronic credential; and the second processor of the signature server is further configured to execute the one or more instructions to receive the second credential object and embed the second credential object into the first signed document to generate a second signed document.

2. The system of claim 1, wherein:

the first signature information includes first identity verification information;

the second signature information includes second identity verification information; and the second processor of the signature server is further configured to execute the one or more instructions to:

verify whether the first identity verification information is correct;

transmit the first credential request to the credential server after verifying that the first identity verification information is correct;

verify whether the second identity verification information is correct; and transmit the second credential request to the credential server after verifying that the second identity verification information is correct.

3. The system of claim 2, wherein:

in the first credential authorization procedure:

the second communication component of the credential server is further configured to transmit first permission information in response to the first credential request;

the second processor of the signature server is further configured to execute the one or more instructions to receive the first permission information, generate a first permission link according to the first permission information, and transmit the first permission link to the first electronic device;

the third processor of the first electronic device is further configured to generate a first confirmation signal according to the first permission link, and the first communication component is further configured to transmit the first confirmation signal to the credential server; and the second communication component of the credential server is further configured to receive the first confirmation signal and transmit the first credential object to the signature server in response to the first confirmation signal;

in the second credential authorization procedure:

the second communication component of the credential server is further configured to transmit second permission information in response to the second credential request;

the second processor of the signature server is further configured to execute the one or more instructions to receive the second permission information, generate a second permission link according to the second permission information, and transmit the second permission link to the second electronic device;

the fifth processor of the second electronic device is further configured to generate a second confirmation signal according to the second permission link, and the third communication component is further configured to transmit the second confirmation signal to the credential server; and the second communication component of the credential server is further configured to receive the second confirmation signal and transmit the second credential object to the signature server in response to the second confirmation signal.

4. The system of claim 2, wherein:

the first electronic device further includes a first display and a first input component;

the first display is configured to display the assignment document;

the first input component is configured to receive a first input via the first input component to generate a first signature object on the assignment document, wherein the first signature information further comprises the first signature object;

the second electronic device further includes a second display and a second input component;

the second display is configured to display the first signed document; and the second input component is configured to receive a second input via the second input component to generate a second signature object on the first signed document, wherein the second signature information further comprises the second signature object.

5. The system of claim 4, wherein:

in the first credential authorization procedure:

the second communication component of the credential server is further configured to transmit first permission information in response to the first credential request;

the second processor of the signature server is further configured to execute the one or more instructions to receive the first permission information;

the second processor of the signature server is further configured to execute the one or more instructions to generate a first permission link according to the first permission information and transmit the first permission link to the first electronic device;

the third processor of the first electronic device is further configured to generate a first confirmation signal according to the first permission link, and the first communication component is further configured to transmit the first confirmation signal to the credential server;

the second communication component of the credential server is further configured to receive the first confirmation signal and transmit a first authorization success signal to the signature server in response to the first confirmation signal;

in response to the first authorization success signal, the second processor of the signature server is further configured to execute the one or more instructions to:

combine the first signature object with the assignment document, and extract a first specified feature from the assignment document combined with the first signature object and transmit the first specified feature to the credential server;

in the second credential authorization procedure:

the second communication component of the credential server is further configured to transmit second permission information in response to the second credential request;

the second processor of the signature server is further configured to execute the one or more instructions to receive the second permission information;

the second processor of the signature server is further configured to execute the one or more instructions to generate a second permission link according to the second permission information and transmit the second permission link to the second electronic device;

the fifth processor of the second electronic device is further configured to generate a second confirmation signal according to the second permission link, and the third communication component is further configured to transmit the second confirmation signal to the credential server;

the second communication component of the credential server is further configured to receive the second confirmation signal and transmit a second authorization success signal to the signature server in response to the second confirmation signal;

in response to the second authorization success signal, the second processor of the signature server is further configured to execute the one or more instructions to:

combine the second signature object with the first signed document, and extract a second specified feature from the first signed document combined with the second signature object and transmit the second specified feature to the credential server;

the fourth processor of the credential server is further configured to:

generate the first credential object according to the first specified feature and the first electronic credential, and generate the second credential object according to the second specified feature and the second electronic credential;

the second processor of the signature server is further configured to execute the one or more instructions to:

receive the first credential object from the credential server and embed the first credential object into the assignment document combined with the first signature object to generate the first signed document, and receive the second credential object from the credential server and embed the second credential object into the first signed document combined with the second signature object to generate the second signed document.

6. The system of claim 5, wherein:

the third storage component of the credential server is further configured to store a third electronic credential;

the second processor of the signature server is further configured to execute the one or more instructions to extract a third specified feature from the second signed document and transmit the third specified feature to the credential server;

the fourth processor of the credential server is further configured to generate a third credential object according to the third specified feature and the third electronic credential, and the second communication component is further configured to transmit the third credential object to the signature server; and the second processor of the signature server is further configured to execute the one or more instructions to receive the third credential object from the credential server and embed the third credential object into the second signed document to generate a third signed document.

7. A method for embedding credentials on an electronic document, the method comprising:

receiving an assigned task and generating at least a first signature request and a second signature request according to the assigned task, wherein the assigned task is associated with an assignment document;

transmitting the first signature request to a first electronic device, such that the first electronic device generates first signature information according to the first signature request;

receiving the first signature information from the first electronic device and transmitting a first credential request to a credential server according to the first signature information, such that the credential server initiates a first credential authorization procedure in response to the first credential request to generate and transmit a first credential object;

receiving the first credential object from the credential server and embedding the first credential object into the assignment document to generate a first signed document;

transmitting the second signature request to a second electronic device, such that the second electronic device generates second signature information according to the second signature request;

receiving the second signature information from the second electronic device and transmitting a second credential request to the credential server according to the second signature information, such that the credential server initiates a second credential authorization procedure in response to the second credential request to generate and transmit a second credential object; and receiving the second credential object from the credential server and embedding the second credential object into the first signed document to generate a second signed document.

8. The method of claim 7, wherein:

the first signature information includes first identity verification information;

the second signature information includes second identity verification information; and the method further comprises:

verifying whether the first identity verification information is correct;

transmitting the first credential request to the credential server after verifying that the first identity verification information is correct;

verifying whether the second identity verification information is correct; and transmitting the second credential request to the credential server after verifying that the second identity verification information is correct.

9. The method of claim 8, further comprising:

in the first credential authorization procedure:

receiving, from the credential server, first permission information transmitted in response to the first credential request and generating a first permission link according to the first permission information; and transmitting the first permission link to the first electronic device, such that the first electronic device generates a first confirmation signal according to the first permission link and such that the credential server transmits the first credential object in response to the first confirmation signal;

in the second credential authorization procedure:

receiving, from the credential server, second permission information transmitted in response to the second credential request and generating a second permission link according to the second permission information; and transmitting the second permission link to the second electronic device, such that the second electronic device generates a second confirmation signal according to the second permission link and such that the credential server transmits the second credential object in response to the second confirmation signal.

10. The method of claim 8, wherein:

the first signature information further comprises a first signature object generated by the first electronic device on the assignment document;

the second signature information further comprises a second signature object generated by the second electronic device on the first signed document; and the method further comprises:

in the first credential authorization procedure:

receiving, from the credential server, first permission information transmitted in response to the first credential request and generating a first permission link according to the first permission information;

transmitting the first permission link to the first electronic device, such that the first electronic device generates a first confirmation signal according to the first permission link and such that the credential server transmits a first authorization success signal in response to the first confirmation signal;

combining the first signature object with the assignment document in response to the first authorization success signal;

extracting a first specified feature from the assignment document combined with the first signature object and transmitting the first specified feature to the credential server, such that the credential server generates the first credential object according to the first specified feature and a first electronic credential; and receiving the first credential object from the credential server and embedding the first credential object into the assignment document combined with the first signature object to generate the first signed document;

in the second credential authorization procedure:

receiving, from the credential server, second permission information transmitted in response to the second credential request and generating a second permission link according to the second permission information;

transmitting the second permission link to the second electronic device, such that the second electronic device generates a second confirmation signal according to the second permission link and such that the credential server transmits a second authorization success signal in response to the second confirmation signal;

combining the second signature object with the first signed document in response to the second authorization success signal;

extracting a second specified feature from the first signed document combined with the second signature object and transmitting the second specified feature to the credential server, such that the credential server generates the second credential object according to the second specified feature and a second electronic credential; and receiving the second credential object from the credential server and embedding the second credential object into the first signed document combined with the second signature object to generate the second signed document.

11. The method of claim 10, further comprising:

extracting a third specified feature from the second signed document and transmitting the third specified feature to the credential server, such that the credential server generates a third credential object according to the third specified feature and a third electronic credential; and receiving the third credential object from the credential server and embedding the third credential object into the second signed document to generate a third signed document.

12. A device for embedding credentials on an electronic document, the device comprising:

a storage component configured to store one or more instructions; and a processor electrically coupled to the storage component and configured to execute the one or more instructions to:

receive an assigned task and generate at least a first signature request and a second signature request according to the assigned task, wherein the assigned task is associated with an assignment document;

transmit the first signature request to a first electronic device, such that the first electronic device generates first signature information according to the first signature request;

receive the first signature information from the first electronic device and transmit a first credential request to a credential server according to the first signature information, such that the credential server initiates a first credential authorization procedure in response to the first credential request to generate and transmit a first credential object;

receive the first credential object from the credential server and embed the first credential object into the assignment document to generate a first signed document;

transmit the second signature request to a second electronic device, such that the second electronic device generates second signature information according to the second signature request;

receive the second signature information from the second electronic device and transmit a second credential request to the credential server according to the second signature information, such that the credential server initiates a second credential authorization procedure in response to the second credential request to generate and transmit a second credential object; and receive the second credential object from the credential server and embed the second credential object into the first signed document to generate a second signed document.

13. The device of claim 12, wherein:

the first signature information includes first identity verification information;

the second signature information includes second identity verification information; and the processor is further configured to execute the one or more instructions to:

verify whether the first identity verification information is correct;

transmit the first credential request to the credential server after verifying that the first identity verification information is correct;

verify whether the second identity verification information is correct; and transmit the second credential request to the credential server after verifying that the second identity verification information is correct.

14. The device of claim 13, wherein the processor is further configured to execute the one or more instructions to:

in the first credential authorization procedure:

receive, from the credential server, first permission information transmitted in response to the first credential request and generate a first permission link according to the first permission information; and transmit the first permission link to the first electronic device, such that the first electronic device generates a first confirmation signal according to the first permission link and such that the credential server transmits the first credential object in response to the first confirmation signal;

in the second credential authorization procedure:

receive, from the credential server, second permission information transmitted in response to the second credential request and generate a second permission link according to the second permission information; and transmit the second permission link to the second electronic device, such that the second electronic device generates a second confirmation signal according to the second permission link and such that the credential server transmits the second credential object in response to the second confirmation signal.

15. The device of claim 13, wherein:

the first signature information further comprises a first signature object generated by the first electronic device on the assignment document;

the second signature information further comprises a second signature object generated by the second electronic device on the first signed document; and the processor is further configured to execute the one or more instructions to:

in the first credential authorization procedure:

receive, from the credential server, first permission information transmitted in response to the first credential request and generate a first permission link according to the first permission information;

transmit the first permission link to the first electronic device, such that the first electronic device generates a first confirmation signal according to the first permission link and such that the credential server transmits a first authorization success signal in response to the first confirmation signal;

combine the first signature object with the assignment document in response to the first authorization success signal;

extract a first specified feature from the assignment document combined with the first signature object and transmit the first specified feature to the credential server, such that the credential server generates the first credential object according to the first specified feature and a first electronic credential; and receive the first credential object from the credential server and embed the first credential object into the assignment document combined with the first signature object to generate the first signed document;

in the second credential authorization procedure:

receive, from the credential server, second permission information transmitted in response to the second credential request and generate a second permission link according to the second permission information;

transmit the second permission link to the second electronic device, such that the second electronic device generates a second confirmation signal according to the second permission link and such that the credential server transmits a second authorization success signal in response to the second confirmation signal;

combine the second signature object with the first signed document in response to the second authorization success signal;

extract a second specified feature from the first signed document combined with the second signature object and transmit the second specified feature to the credential server, such that the credential server generates the second credential object according to the second specified feature and a second electronic credential; and receive the second credential object from the credential server and embed the second credential object into the first signed document combined with the second signature object to generate the second signed document.

16. The device of claim 15, wherein the processor is further configured to execute the one or more instructions to:

extract a third specified feature from the second signed document and transmit the third specified feature to the credential server, such that the credential server generates a third credential object according to the third specified feature and a third electronic credential; and receive the third credential object from the credential server and embed the third credential object into the second signed document to generate a third signed document.

* * * * *